US 9,823,856 B1

(12) United States Patent
Tripathi (10) Patent No.: US 9,823,856 B1
(45) Date of Patent: Nov. 21, 2017

(54) INTELLIGENT FLASH ARCHITECTURE (71) Applicant: Shailendra Tripathi, Newark, CA (US)

(72) Inventor: Shailendra Tripathi, Newark, CA (US)

( * ) Notice: Subject to any disclaimer, the term of this patent is extended or adjusted under 35 U.S.C. 154(b) by 0 days.

(21) Appl. No.: 15/441,248

(22) Filed: Feb. 24, 2017

(51) Int. Cl.
*G06F 12/02* (2006.01)
*G06F 3/06* (2006.01)
*G06F 12/0868* (2016.01)

(52) U.S. Cl.
CPC ............ *G06F 3/0611* (2013.01); *G06F 3/064* (2013.01); *G06F 3/065* (2013.01); *G06F 3/0619* (2013.01); *G06F 3/0659* (2013.01); *G06F 3/0679* (2013.01); *G06F 3/0685* (2013.01); *G06F 12/0868* (2013.01); *G06F 2212/604* (2013.01)

(58) Field of Classification Search
None
See application file for complete search history.

(56) References Cited

U.S. PATENT DOCUMENTS

| 5,790,886 | A | 8/1998 | Allen |
| 8,793,429 | B1 * | 7/2014 | Call .................. G06F 12/0246 711/103 |
| 2005/0086430 | A1 | 4/2005 | Allen et al. |

* cited by examiner

*Primary Examiner* — Duc Doan
(74) *Attorney, Agent, or Firm* — Lyman Moulton, Esq.

(57) ABSTRACT

A disclosed system and method executable on a computer for managing a memory storage system includes prioritizing log data over cache data and over metadata in a configuration of multiple SSD (solid state drive) devices stitched in a virtual pool of data types including log write data, cache read data and metadata. The method also includes stitching the data types in the configuration across the multiple SSD devices in the virtual pool configured for a variable percentage cache data and a variable percentage metadata on top of a fixed percentage log data. The method further includes protecting the stitched data type configuration of multiple SSD devices in the virtual pool by creating multiple copies of the log data and multiple copies of the metadata and a single copy of the cache data. An intelligent and dynamic adjustment of metadata and cache data is based on a growth of the metadata.

20 Claims, 6 Drawing Sheets

INTELLIGENT FLASH ARCHITECTURE

BACKGROUND OF THE INVENTION

Solid-state arrays have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. More vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

The typical approach to providing a high performance digital storage system has been to include high RPM (revolutions per minute) drives and to increase the number of drives available to distribute the memory storage load. However, this approach has increased the initial system cost to acquire a large number of expensive disks and has also increased ongoing costs to power and cool these disks. Metadata, or data describing data, has therefore been utilized to compress data and to avoid storage of duplicate copies of compressed data by storing the location of duplicate copies in memory.

In current hard drive and solid state memory hybrid configurations, the SSD (solid state drive) drives are statically and physically partitioned into 3 sets—each representing their use cases—Log (write cache), L2 cache (read cache), and metadata. This division has been primarily driven by the capacity sizing and is not in sync with the performance requirements of IOPS (Instructions Operations per second) and/or bandwidth (BW).

This creates imbalance in the life-cycle of the SSD uses and is not a very efficient utilization of the performance capacity available from SSD devices. Most of the time, the usage is bi-modal, and, hence, it effectively wastes the performance available from the underlying devices. The usage of metadata, for example, is pretty pronounced in second phase of spa_sync (Storage Pool Allocator synchronize), for rest of the time, the metadata usage is pretty quiet. The bi-modal behavior can be driven by the application as well. For example, typical new data write workloads stress on log (write) and cache (read) and much less on metadata whereas metadata oriented workloads stress more on metadata IOPS with much less stress on log and cache. Hence, the SSD devices are not being used optimally when they are physically partitioned.

The problem is not only evident in performance and under-utilization, even the SSD usage is quite in-efficient. When the pool does not have too much metadata, the physically partition is effectively wasting the space which could be consumed by the cache (read) to provide higher performance. As the metadata usage grows, the cache (read) space can make way to the metadata space, providing flexibility.

In traditional storage systems, metadata is stored on the disk itself. When data is being written or read from disk, the storage system has to write or read the metadata as well. This adds to the overhead of the overall write or read operation in terms of access time and latency as well as to hardware costs. There is therefore a long felt need for a block and file storage system with accelerated metadata management capable of scaling to larger disk storage.

SUMMARY OF THE INVENTION

A disclosed method of managing a memory storage system includes prioritizing input/output service of a log data over cache data and over metadata in a configuration of multiple SSD (solid state drive) devices stitched in a virtual pool of data types including log write data, cache read data and metadata. The method also includes stitching the data types in the configuration across the multiple SSD devices in the virtual pool configured for a variable percentage cache data and a variable percentage metadata on top of a fixed percentage log data. The method further includes protecting the stitched data type configuration of multiple SSD devices in the virtual pool by creating multiple copies of the log data and multiple copies of the metadata and a single copy of the cache data.

A disclosed system of managing a memory storage system includes a module configured to prioritize log data over cache data and over metadata in a configuration of multiple SSD devices stitched in a virtual pool of data types including log write data, cache read data and metadata. The system also includes a module configured to stitch the data types in the configuration across the multiple SSD devices in the virtual pool configured for a variable percentage cache data and a variable percentage metadata on top of a fixed percentage log data. The system further includes a module configured to protect the stitched data type configuration of multiple SSD devices in the virtual pool by creating multiple copies of the log data and multiple copies of the metadata and a single copy of the cache data.

A disclosed computer readable storage medium comprising computer executable instructions that when executed by a processor perform a method of managing a memory storage system including prioritizing log data over cache data and over metadata in a configuration of multiple SSD devices stitched in a virtual pool of data types including log write data, cache read data and metadata. The computer readable storage medium also includes computer executable instructions for stitching the data types in the configuration across the multiple SSD devices in the virtual pool configured for a variable percentage cache data and a variable percentage metadata on top of a fixed percentage log data. The computer readable storage medium further includes computer executable instructions for protecting the stitched data type configuration of multiple SSD devices in the virtual pool by creating multiple copies of the log data and multiple copies of the metadata and a single copy of the cache data.

Other aspects and advantages of embodiments of the disclosure will become apparent from the following detailed description, taken in conjunction with the accompanying drawings, illustrated by way of example of the principles of the disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'data type' refers to any storage class memory including NVDIMM (non-volatile dual inline memory module), NVMe (non-volatile memory host controller interface), and sequential or streaming data and random accessed type stored data. Disclosed methods, devices and systems further comprise sequential and random access data types having an I/O service prioritization, a stitching allocator and different data protection.

The present disclosure comprises accelerated SSD flash drives that are dedicated for metadata and data storage. Though an SSD may sometimes be referred to as a solid state disk, SSD flash drives have no moving head and can therefore provide a magnitude better performance compared to high RPM disk drives. Since a metadata lookup or query is often the critical path for a read and write of data, the critical path savings for accelerated metadata is passed on to all data operations. In other words, all datapath metadata may reside on dedicated SSDs and hence any datapath write or read operations comprising a metadata query may be accelerated compared to non-accelerated storage architectures. The present disclosure also takes advantage of SSD flash drives as a second layer of cache in addition to the primary RAM cache. This may enable lower cost disk drives to be used as backend storage disks depending on the spatial locality characteristics of the data to be stored. Scalability of the present disclosure therefore may refer not only to adding more disk memory for data but also may refer to adding more accelerated memory for metadata and for dataflow in an accelerated datapath.

An integrated log, cache and metadata intelligent flash architecture comprises four general-purpose arrays and three solid-state arrays, all of which are based on the same hardware and software architecture, and all of which support block and file protocols. The raw capacity of the largest array, the T3400, is relatively small at 314 TB. However, since the Tegile® arrays are some of the few general-purpose disk arrays that have in-line compression and deduplication (depending on the data types), the usable capacity can often be several times larger and provide a very competitive price per usable capacity. The data reduction ratios also provide an environmental advantage in terms of power, cooling and physical rack space. The hardware is designed to be simple to maintain, and customers are allowed to add expansion shelves and extra disk capacity, and also to perform software upgrades and apply fixes themselves.

The same hardware, software architecture and technology are used across the entire disclosed storage array portfolio. Selective in-line data reduction and compression allow customers to select data reduction where required and, just as importantly, to disable it for unsuitable workloads. All software features are included in the base price of the storage array.

The solution to the problems and challenges of the present art is the disclosed new architecture with the following objectives.
  a. Different(Variable) Data protection by type of usage—The architecture allows the different data types to have their own data protection (from drive failure) while sharing the same physical drives.
  b. Shared Capacity—The memory capacity is shared between all the consumers.
  c. Shared IOPS/MBPS—Shared drives allows performance sharing.
  d. Prioritization of the Data types—Shared pooling creates a platform to provide prioritization among the data classes.

Figure 1:
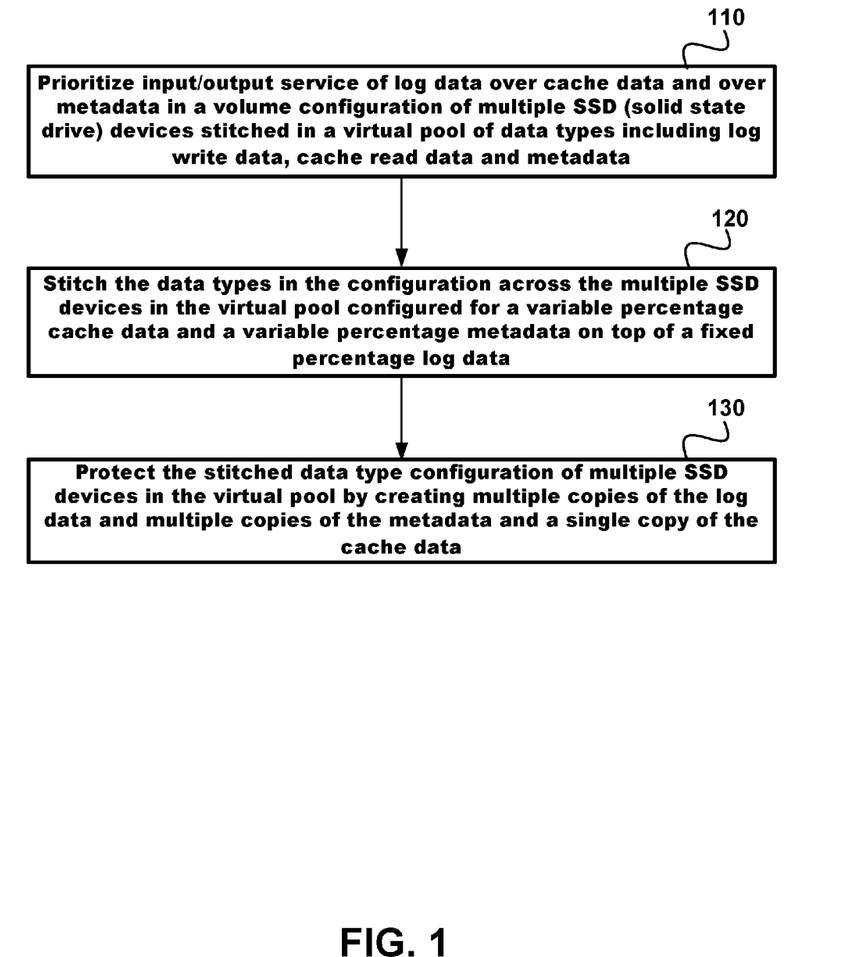
FIG. 1 is a flow chart of a method for intelligent flash memory architecture management in accordance with an embodiment of the present disclosure.

Based on the above objectives, the Meta SSD architecture has been re-designed to create an 'iflash' ® architecture. The SSD devices are now virtualized by pooling them together (dynamic partition). The logical functions are served on top. The log (write), cache (read), and, metadata are created as logical areas. The log (write) partition is in the first 4G area from each SSD device. The rest of the data area is shared between metadata and cache (read). FIG. 1 is a pictorial view of the log, cache and metadata SSDs pooled together.

Therefore, "Iflash"® is a keyword stating, the devices following should be administered as Iflash® devices. Then there are zpool properties which determine how to configure the Iflash® devices. Embodiments include the ability to train the disclosed system and software to find what is the best configuration for any Iflash® devices. So, the "iflash"® keyword is an indicator to kick in the internal engine disclosed to do the rest of the stuff based on certain "engineered" defaults.

By default, the disclosed system, methods and software take away 1% of memory space for the log class but other percentage utilizations are changeable via disclosed settings. For instance, the property name: "zfs_vdev_ms_shift" allows changing settings.

The rest of the memory space is divided between metadata class and cache/data class through the command prompt, "mincache_pct." In the event the default is not desired, it can be changed as follows.

zpool create -o mincache_pct=10< >
  # zpool get all p1

For instance, . . . "p1 mincache_pct 33 default" creates a default minimum cache percentage of 33%.

The command, "mcopies" is also part of the disclosed iFlash® architecture. This command defines how many drives are created in the event of drive failure that can be handled. (Total drives handled in the event of disk failure is: mcopies −1).

By default, mcopies is set to 2 when a keyword is chosen. If it is desired to change the mcopies argument to different value, it must be changed while creating the pool as follows:

zpool create -o mcopies=3< >

The disclosure also provides for intelligently tuning the percentage Log, meta, and, cache data types created on the devices including an absence of a specified data type at all. For instance:

a) If one chooses "mincache_pct=0," the disclosed Iflash® engine will not create cache/data areas. On the other hand,
  b) If one adds "slice=off," the disclosed Iflash® engine will not create log and meta areas as well. But,
  c) If one keeps slice=on and log_meta_shift, the disclosed Iflash® engine will not create a log area at all.

By default, and in practice, it is usual to always create all 3 and the slice is set to on. for instance, # zpool get all p1 and . . . p1 slice on default . . . and zpool create -o slice=off < > to not do it.

Please note that the present disclosure automates these steps in the disclosed methods, systems and software—that is, the administrator of the disclosed file system need not know or be concerned with the steps.

This is one of the limitations to the USP of the Iflash® design. The design allows for these configuration steps to occur dynamically, and automatically transparent to the administrator and in the background.

Embodiments of the disclosure actually implement dynamic adjustment of metadata and cache data based on the metadata growth using the Iflash® Architecture as disclosed.

An embodiment of the disclosure also has the ability to control, while processing the I/Os, how much data is processed from log, cache data, and metadata. Again, this can be created with some defaults—but system structure, methods and software are disclosed which automatically monitors the log, metadata, and cache data load dynamically to adjust the priorities for the three data classes.

Volume Creation

A zpool volume in the Iflash® architecture default configuration is created as below. The interrogative zpool creates a pool named sp1 on a disk d0 named c1t5 . . . including three Iflash® volumes. The interrogative further below, zpool iostat, displays the attributes of the sp1 pool on the disk d0 named c1t5 . . . including the three Iflash® volumes. Data is stripped across the enumerated disks.

zpool create sp1 c1t5000C50041CD529Fd0 c1t5000C5004170EE93d0 iflash c1t5000CCA013067F80d0 c1t5000CCA0130357ECd0 c1t5000CCA013035280d0

| | # zpool iostat -v sp1 | | | | | | | |
|---|---|---|---|---|---|---|---|---|
| | capacity | | operations | | bandwidth | | latency (ms) | |
| pool | alloc | free | read | write | read | write | read | write |
| sp1 | 11.4G | 3.62T | 0 | 0 | 1.41K | 94 | 3.65 | 0.18 |
| c1t5000C50041CD529Fd0 | 5.69G | 1.81T | 0 | 0 | 181 | 7 | 30.72 | 0.46 |
| c1t5000C5004170EE93d0 | 5.66G | 1.81T | 0 | 0 | 212 | 8 | 2.89 | 0.46 |
| iflash | — | — | — | — | — | — | — | — |
| c1t5000CCA013067F80d0 | 1.34G | 185G | 0 | 0 | 331 | 15 | 0.58 | 0.11 |
| c1t5000CCA0130357ECd0 | 1.40G | 185G | 0 | 0 | 343 | 11 | 0.72 | 0.11 |
| c1t5000CCA013035280d0 | 1.37G | 185G | 0 | 0 | 372 | 50 | 0.60 | 0.08 |

I/O and Space Characterization

The zpool list, and, zpool iostat commands are modified and enhanced per the iFlash® architecture in order to show the requisite disclosed I/O types with respect to the disks created.

| # zpool list sp1 | | | | | | |
|---|---|---|---|---|---|---|
| NAME | SIZE | ALLOC | FREE | CAP | DEDUP | HEALTH | ALTROOT |
| sp1 | 3.63T | 11.4G | 3.62T | 0% | 1.00x | ONLINE | — |
| MSIZE | MALLOC | MFREE | MCAP | LSIZE | LALLOC | LFREE | LCAP |
| 372G | 4.12G | 368G | 1% | 12G | 12K | 12.0G | 0% | zpool iostat -v{l,m, c} p1

The zpool iostat -l will show I/Os related to log data, -m related to metadata, and, -c will show I/Os related to cache data operations.

Drive Failure Protection

The metadata and the log data (write cache) must be protected from drive failures, while the cache data (read data) does not need the drive failure protection because it can be regenerated.

This mixed data protection requirement is met by adding all devices in stripe format and by creating more than 1 copy for log and metadata. For example, 2 metadata copies will be created to address the data protection for log and metadata. However, cache data will be created with only one copy.

A zpool option has been added to provide configurable mcopies option. The mcopies must be passed during zpool create operation and cannot be changed afterwards. By default, mcopies is set to 2 and is applicable to both log and meta I/Os. Cache data has only one copy created.

zpool create -o mcopies=3 -f sp1 mirror c1t5000C50041CD529Fd0 c1t5000C500417OEE93d0 iflash c1t5000CCA013067F80d0 c1t5000CCA0130357ECd0 c1t5000CCA013035280d0 zpool get all p1
zpool get all sp1
NAME PROPERTY VALUE SOURCE
sp1 size 3.63 T -
. . .
sp1 logcapacity 0% -
sp1 mcopies 3 local Metadata/Cache Ratio Configuration When creating the pool, a metadata/cache(read) percentage and ratio can be specified which is different from the default 50%-50% for metadata and cache(read). In fact, any arbitrary metadata to cache data ratio can be specified by the customer or set in engineered defaults as explained further below once a log data minimum per volume has been satisfied.

FIG. 1 is a flow chart of a method for intelligent flash memory architecture management in accordance with an embodiment of the present disclosure. The method includes prioritizing input/output (I/O) service of 110 log data over cache data and over metadata in a configuration of multiple SSD (solid state drive) devices stitched in a virtual pool of data types including log write data, cache read data and metadata. The method also includes stitching 120 the data types in the configuration across the multiple SSD devices in the virtual pool configured for a variable percentage cache data and a variable percentage metadata on top of a fixed percentage log data. The method further includes protecting 130 the stitched data type configuration of multiple SSD devices in the virtual pool by creating multiple copies of the log data and multiple copies of the metadata and a single copy of the cache data.

Figure 2:
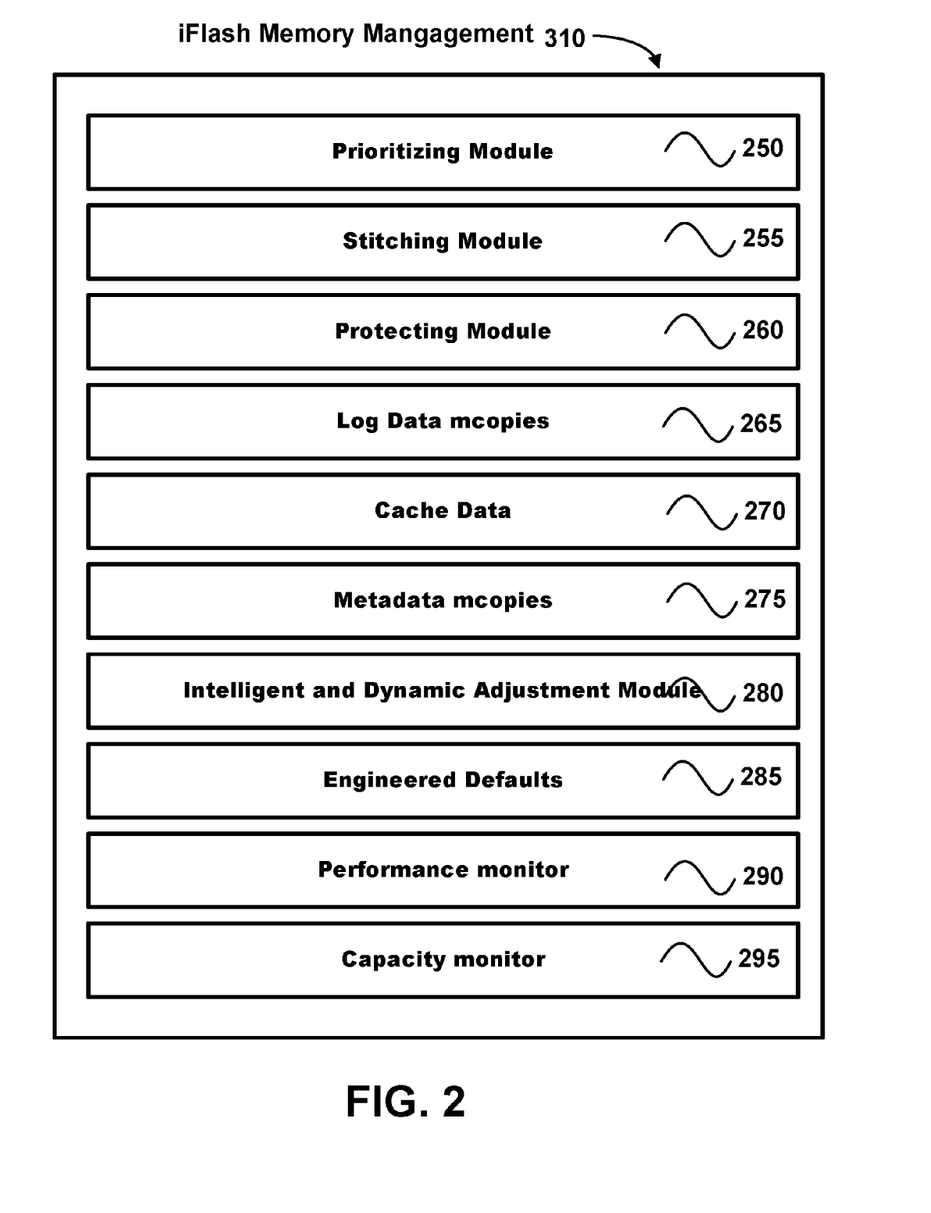
FIG. 2 is a block diagram of the intelligent flash memory architecture management structure in accordance with an embodiment of the present disclosure.

FIG. 2 is a block diagram of the intelligent flash memory architecture management structure in accordance with an embodiment of the present disclosure. The disclosed intelligent flash memory architecture includes a prioritizing module 250, a stitching module 255, a protecting module 260, log data mcopies 265, cache data 270, metadata mcopies 275, an intelligent and dynamic adjustment module 280, engineered defaults 285, a performance module 290 and a capacity monitor 295 within the iFlash® memory management 310. The components of the iFlash® memory management 310 have intra-component and inter-component communication with each other. Other components may be included therein according to embodiments of the disclosure and engineering needs and product development.

A disclosed system of managing a memory storage system includes a module 250 configured to prioritize log data over cache data and over metadata in a configuration of multiple SSD (solid state drive) devices stitched in a virtual pool of data types including log write data, cache read data and metadata. The system also includes a module 255 configured to stitch the data types in the configuration across the multiple SSD devices in the virtual pool configured for a variable percentage cache data and a variable percentage metadata on top of a fixed percentage log data. The system further includes a module 260 configured to protect the stitched data type configuration of multiple SSD devices in the virtual pool by creating multiple copies of the log data and multiple copies of the metadata and a single copy of the cache data.

Figure 3:
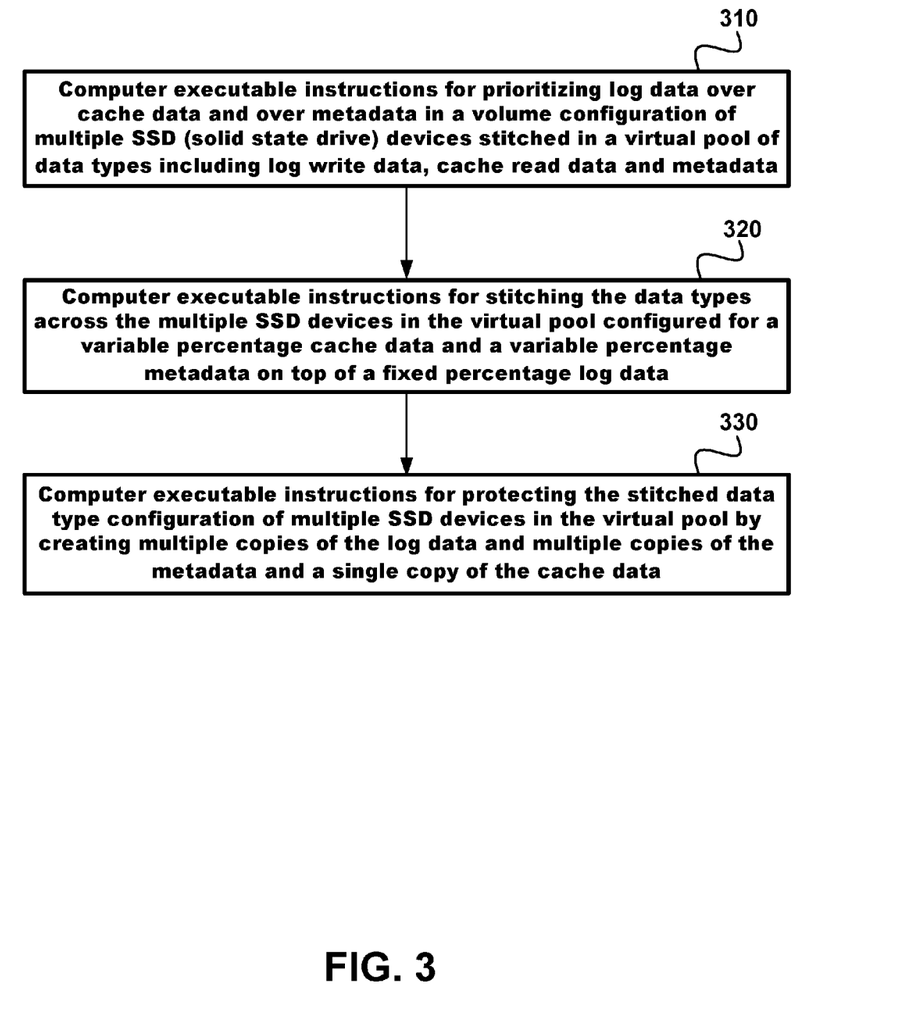
FIG. 3 is a flow chart of computer executable instructions for a method for intelligent flash memory architecture management in accordance with an embodiment of the present disclosure.

FIG. 3 is a flow chart of computer executable instructions for a method for intelligent flash memory architecture management in accordance with an embodiment of the present disclosure. The disclosed computer readable storage medium comprises computer executable instructions that when executed by a processor perform a method of managing a memory storage system including prioritizing 310 log data over cache data and over metadata in a volume configuration of multiple SSD (solid state drive) devices stitched in a virtual pool of data types including log write data, cache read data and metadata. The computer readable storage medium also includes computer executable instructions for stitching 320 the data types in the configuration across the multiple SSD devices in the virtual pool configured for a variable percentage cache data and a variable percentage metadata on top of a fixed percentage log data. The computer readable storage medium further includes computer executable instructions for protecting 330 the stitched data type configuration of multiple SSD devices in the virtual pool by creating multiple copies of the log data and multiple copies of the metadata and a single copy of the cache data.

Figure 4:
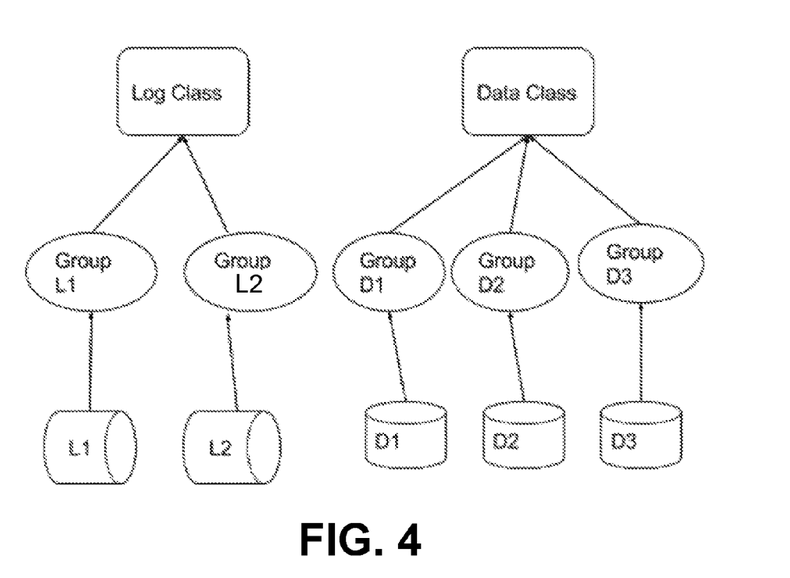
FIG. 4 is a unstitched file system block diagram in accordance with an embodiment of the present disclosure.

FIG. 4 is a unstitched file system block diagram in accordance with an embodiment of the present disclosure. Physical disk space on L1 and L2 are part of respective groups L1 and L2 and part of the log class in the file system. Physical disk space on D1, D2 and D3 are part of the respective groups D1, D2 and D3 in the data class in the file system. Data classes are not shared across physical disks.

Figure 5:
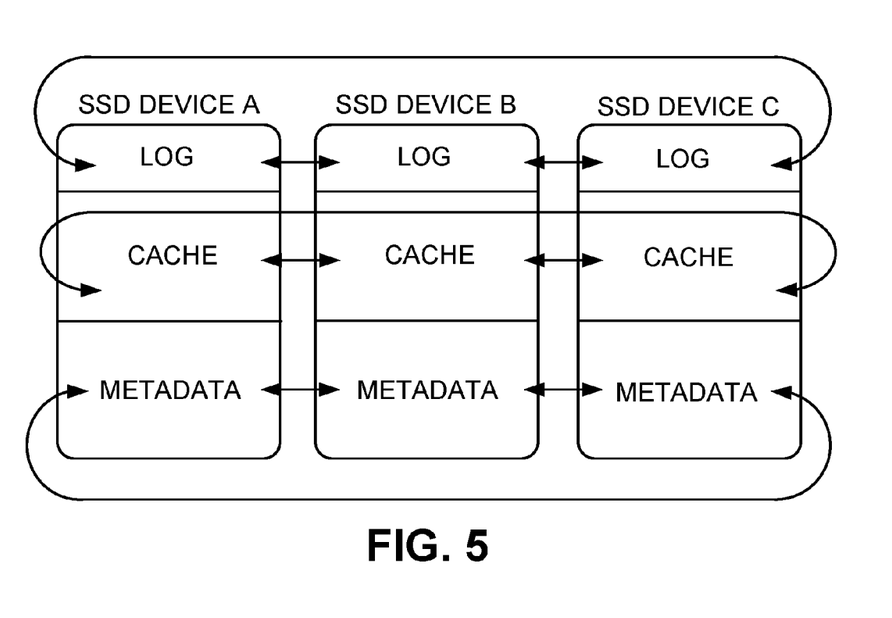
FIG. 5 is a stitched file system block diagram of the intelligent flash memory architecture management in accordance with an embodiment of the present disclosure.

FIG. 5 is a stitched file system block diagram of the intelligent flash memory architecture management in accordance with an embodiment of the present disclosure. Log data in SSD device A is stitched with log data in SSD device B and SSD device C and log data in device B is stitched with log data in device A and C and log data in device C is stitched with log data in device B and device A. Likewise, cache data in SSD devices A, B and C is stitched to form a single logical memory volume sharing the same performance and capacity characteristics. Similarly, metadata in the three SSD devices A, B and C is stitched to form a single logical memory volume sharing the same performance and capacity characteristics. Multiple copies, or mcopies of the log data and the metadata are created and can reside in any of the SSD devices A, B and C or completely elsewhere in the file system of a customer. The boundary lines depicted between the three data types is pictorial only and not intended to indicate scaled ratios or relative memory partitioning there between.

Figure 6:
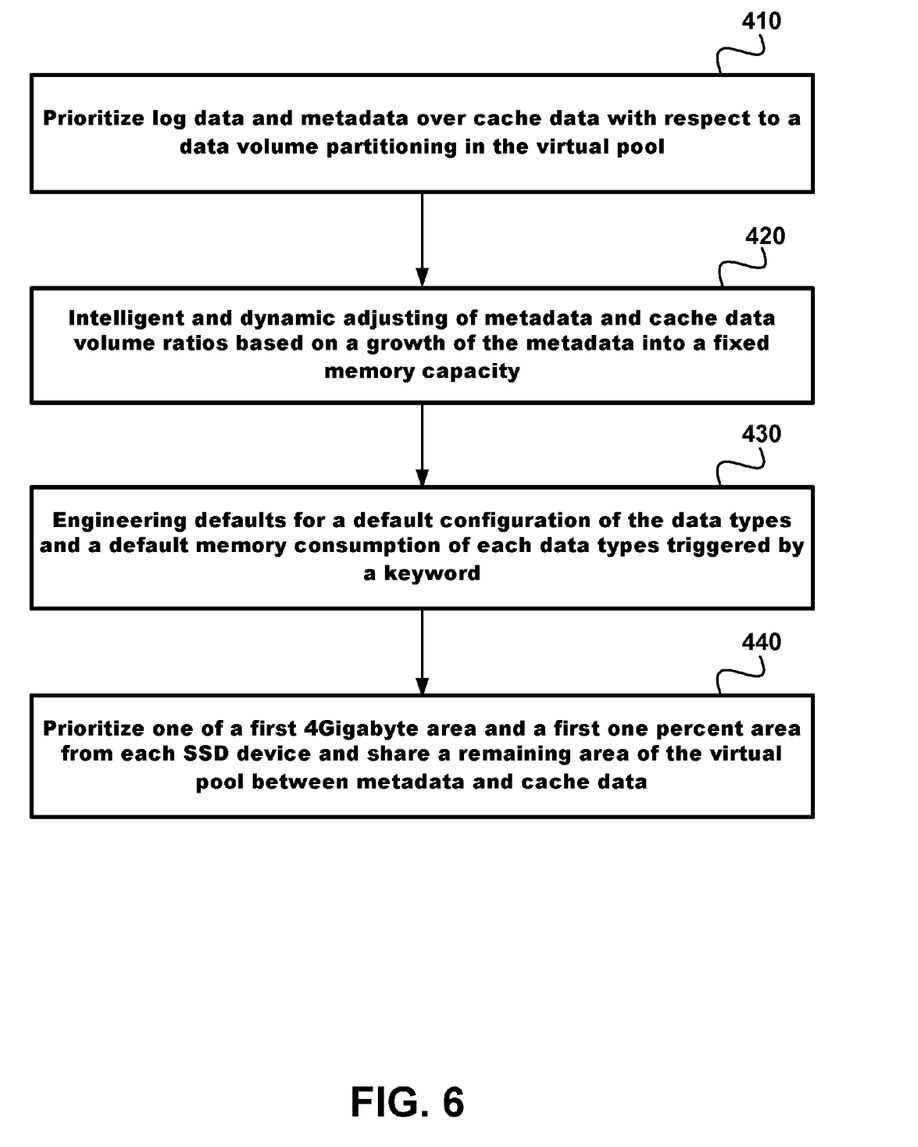
FIG. 6 is a flow chart of another method for intelligent flash memory architecture management in accordance with an embodiment of the present disclosure.

FIG. 6 is a flow chart of another method for intelligent flash memory architecture management in accordance with an embodiment of the present disclosure. The embodied methods include prioritizing 410 log data and metadata over cache data with respect to a data volume partitioning in the virtual pool. The embodied methods also include intelligent and dynamic adjusting 420 of metadata and cache data volume ratios based on a growth of the metadata into a fixed memory capacity. The embodied methods additionally include engineering 430 defaults for a default configuration of the data types and a default memory consumption of each data type triggered by a keyword in administration such as, "iFlash." Other embodied methods as claimed and as depicted are reserved to the Applicants.

Figure 7:
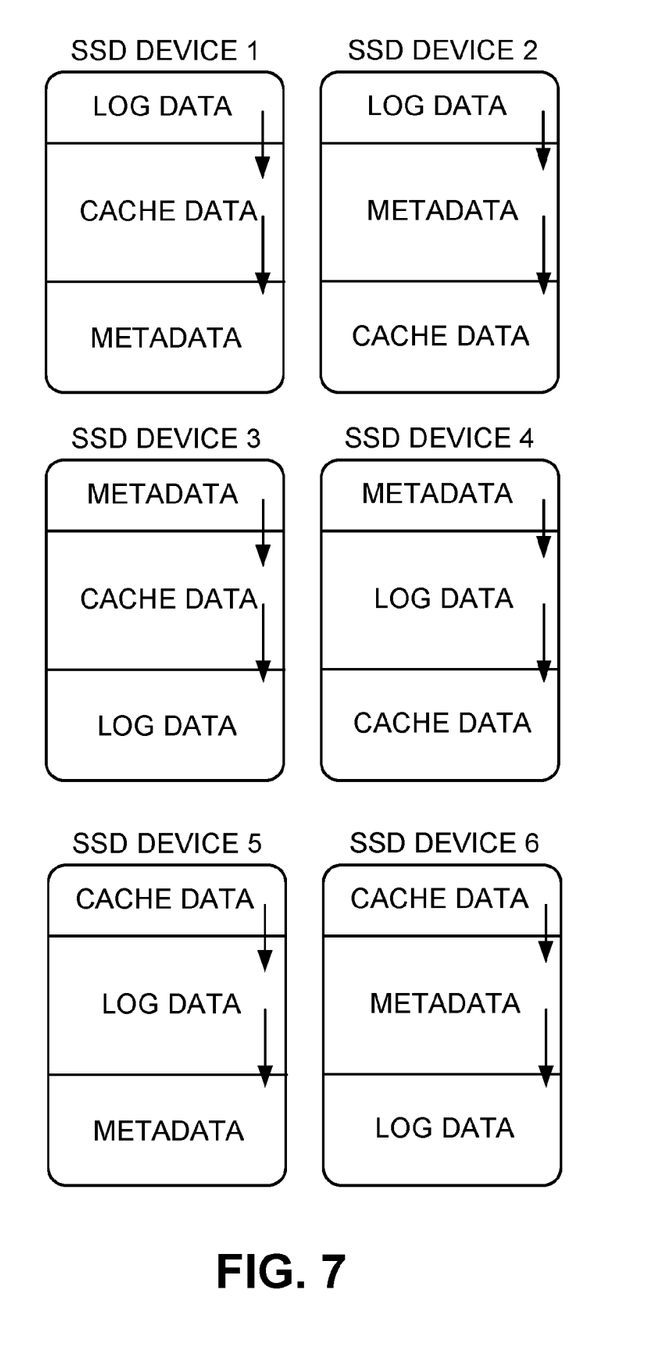
FIG. 7 is a schematic representation of intelligent flash memory prioritization in accordance with an embodiment of the present disclosure.

FIG. 7 is a schematic representation of intelligent flash memory prioritization in accordance with an embodiment of the present disclosure. The prioritization depicts a SSD device 1 having a first priority to log data volume over a secondary priority to cache data volume over a third priority to metadata volume. The prioritization depicts a SSD device 2 having a first priority to log data volume over a secondary priority to metadata volume over a third priority to cache data volume. The prioritization depicts a SSD device 3 having a first priority to metadata volume over a secondary priority to cache data volume over a third priority to log data volume. The prioritization depicts a SSD device 4 having a first priority to metadata volume over a secondary priority to log data volume over a third priority to cache data volume. The prioritization depicts a SSD device 5 having a first priority to cache data volume over a secondary priority to log data volume over a third priority to metadata volume. The prioritization depicts a SSD device 6 having a first priority to cache data volume over a secondary priority to metadata volume over a third priority to log data volume. Prioritization determines memory volume availability of a data type. For instance, should log data fill a memory partition having first priority to log data, no volume will be available for cache data and metadata in the respective virtual pool. Likewise, should log data fill a 50% memory partition having first priority to log data and fill a 50% memory partition to metadata, no volume will be available for cache data in the respective virtual pool. Prioritization is administered intelligently and dynamically both transparent to the customer and also per the customer's setting of defaults and parameters.

The intelligent and dynamic adjusting of metadata and cache data volume ratios is based on a growth of the metadata into a fixed virtual memory capacity. Prioritizing further comprises prioritizing one of a first 4 Gigabyte area and a first one percent area from each SSD device and sharing a remaining area of the virtual pool between metadata and cache data. In other words, stitching the data types for a variable percentage cache data and variable percentage metadata may further comprise 100% metadata memory volume. On the other hand, stitching the data types for a variable percentage cache data and a variable percentage metadata may further comprise a 100% cache data memory volume. The intelligent and dynamic adjustment module is configured to adjust a ratio of metadata and cache data volumes based on a growth of the metadata into a fixed memory capacity. Engineered defaults automatically specify a default configuration of the data types and a default memory consumption of each data type is triggered by a keyword. Furthermore, log data, metadata and cache data types are dynamically striped logical areas in the virtual pool based on a percent existence of the three data types.

The disclosed prioritization and stitching allow the iFlash® architecture to deliver higher performance over existing file systems. IFlash® protection as disclosed herein provides the most efficient data integrity within the prioritization and stitching of the iFlash® architecture. Therefore, the iFlash® memory management disclosed provides the highest flexible file systems available to customers.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents.

The described techniques for designating a data type preference order may be implemented as a method, apparatus or article of manufacture using standard programming and/or engineering techniques to produce software, firmware, hardware, or any combination thereof. The term "system" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, storage networks (e.g., SAN or NAS), etc.). The computer readable medium is accessed and executed by a processor. The resulting code in which described embodiments are implemented may further be accessible through a transmission medium or from a file server over a network. In such cases, the system in which the code is implemented may comprise a transmission media, such as a network transmission line, wireless transmission media, signals propagating through space, radio waves, infrared signals, etc. Thus, the "system" may comprise the medium in which the code is embodied. Additionally, the "system" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The steps disclosed describe specific operations of which some or more are occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

Disclosed is an architecture of a file system that may be used in accordance with certain implementations of the disclosure. The file system may implement a processor (e.g., a microprocessor), a memory (e.g., a volatile memory device), and storage (e.g., a non-volatile storage area, such as magnetic disk drives, optical disk drives, a tape drive, etc.). An operating system may execute in memory. The storage may comprise an internal storage device or an attached or network accessible storage. Computer programs in storage may be loaded into the memory and executed by the processor in a manner known in the art. The SSD architecture further includes circuits to enable communication with a network. An input device is used to provide user input to the processor, and may include a keyboard, mouse, pen-stylus, microphone, touch sensitive display screen, or any other activation or input mechanism known in the art. An output device is capable of rendering information transmitted from the processor, or other component, such as a display monitor, printer, storage, etc. The file system architecture implementing the disclosed systems may include fewer components than illustrated, additional components not illustrated herein, or some combination of the components illustrated and additional components.

The disclosed file system and computer architecture may comprise any computing device known in the art, such as a mainframe, server, personal computer, workstation, laptop, handheld computer, telephony device, network appliance, virtualization device, storage controller, etc. Any processor and operating system known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method of managing a memory storage system, comprising:
   a) prioritizing input/output (I/O) service of a first log data over a second cache data and over a third metadata in a volume allocation of storage class memories stitched in a virtual pool of data types;
   b) stitching the data types in the allocation across the multiple SSD devices in the virtual pool configured for a variable percentage cache data and a variable percentage metadata on top of a fixed percentage log data; and
   c) protecting the stitched data type allocation of multiple SSD devices in the virtual pool by creating multiple copies of the log data and multiple copies of the metadata and a single copy of the cache data.

2. The method of managing a memory storage system of claim 1, wherein the data types further comprise sequential access and random access data types having the I/O service prioritizing, the allocation stitching and the different data protecting.

3. The method of managing a memory storage system of claim 1, wherein the prioritizing further comprises prioritizing log data and metadata over cache data with respect to a data volume partitioning in the virtual pool.

4. The method of managing a memory storage system of claim 1, wherein the prioritizing further comprises prioritizing metadata over cache data and over log data with respect to data volume partitioning in the virtual pool.

5. The method of managing a memory storage system of claim 1, wherein the prioritizing further comprises prioritizing cache data over log data and over metadata with respect to data volume partitioning in the virtual pool.

6. The method of managing a memory storage system of claim 1, further comprising an intelligent and dynamic adjusting of metadata and cache data volume ratios based on a growth of the metadata into a fixed virtual memory capacity.

7. The method of managing a memory storage system of claim 1, further comprising engineering defaults for a default configuration of the data types and a default memory consumption of each data types triggered by a keyword.

8. The method of managing a memory storage system of claim 1, wherein the stitching further comprises creating a plurality of data pools on a single whole disk comprising log data, metadata and cache data stitched together to share a drive capacity and drive performance between all consumers of the data.

9. The method of managing a memory storage system of claim 1, wherein prioritizing log data further comprises prioritizing one of a first 4 Gigabyte area and a first one percent area from each SSD device and sharing a remaining area of the virtual pool between metadata and cache data.

10. The method of managing a memory storage system of claim 1, wherein protecting the stitched data type configuration further comprises creating a plurality of mcopies of the log data and metadata at a time of creation of respective volumes and not afterwards.

11. The method of managing a memory storage system of claim 1, wherein stitching the data types for a variable percentage cache data and variable percentage metadata further comprises 100% metadata.

12. The method of managing a memory storage system of claim 1, wherein stitching the data types for a variable percentage cache data and a variable percentage metadata further comprises 100% cache data.

13. A system of managing a memory storage system, comprising:
   a) a module configured to prioritize log data over cache data and over metadata in a volume configuration of multiple SSD (solid state drive) devices stitched in a virtual pool of data types including log write data, cache read data and metadata;
   b) a module configured to stitch the data types in the configuration across the multiple SSD devices in the virtual pool configured for a variable percentage cache data and a variable percentage metadata on top of a fixed percentage log data; and c) a module configured to protect the stitched data type configuration of multiple SSD devices in the virtual pool by creating multiple copies of the log data and multiple copies of the metadata and a single copy of the cache data.

14. The system of managing a memory storage system of claim 13, wherein the prioritizing module is further configured to prioritizing log data and metadata over cache data with respect to a data volume partitioning in the virtual pool.

15. The system of managing a memory storage system of claim 13, further comprising an intelligent and dynamic adjustment module configured to adjust a ratio of metadata and cache data volumes based on a growth of the metadata into a fixed memory capacity.

16. The system of managing a memory storage system of claim 13, further comprising engineered defaults for a default configuration of the data types and a default memory consumption of each data types triggered by a keyword.

17. A computer readable storage medium comprising computer executable instructions that when executed by a processor perform a method of managing a memory storage system, the method comprising:
   a) prioritizing log data over cache data and over metadata in a volume configuration of multiple SSD (solid state drive) devices stitched in a virtual pool of data types including log write data, cache read data and metadata;
   b) stitching the data types in the configuration across the multiple SSD devices in the virtual pool configured for a variable percentage cache data and a variable percentage metadata on top of a fixed percentage log data; and
   c) protecting the stitched data type configuration of multiple SSD devices in the virtual pool by creating multiple copies of the log data and multiple copies of the metadata and a single copy of the cache data.

18. The computer readable storage medium of claim 17, wherein the prioritizing further comprises prioritizing log data and metadata over cache data with respect to a data volume partitioning in the virtual pool.

19. The computer readable storage medium of claim 17, further comprising an intelligent and dynamic adjusting of metadata and cache data volume ratios based on a growth of the metadata and a fixed memory capacity.

20. The computer readable storage medium of claim 17, further comprising engineering defaults for a default configuration of the data types and a default memory consumption of each data types triggered by a keyword.

* * * * *